Nov. 17, 1953     D. N. MacDONALD     2,659,650

GRAPHIC RECORDER

Filed Aug. 19, 1952

INVENTOR.
DUNCAN N. MacDONALD

BY

ATTY.

Patented Nov. 17, 1953

2,659,650

UNITED STATES PATENT OFFICE 2,659,650

GRAPHIC RECORDER

Duncan N. MacDonald, Arcadia, Calif., assignor to Automatic Electric Laboratories, Inc., Chicago, Ill., a corporation of Delaware Application August 19, 1952, Serial No. 305,164

7 Claims. (Cl. 346—34)

This invention is generally related to improvements in graphic recorders and more specifically to an improvement in high-frequency direct indicating oscillographs with fixed styli.

Means in the prior art for producing records of electrical wave forms include the cathode ray oscillograph and the facsimile type mechanisms. The cathode ray oscillograph produces an immediate visible picture of the electrical wave form, but to form a permanent record of any specific wave form, it has been necessary to first photograph the visible wave form on the cathode ray tube, and to then develop a permanent record through photographic processes. This method of producing a permanent record has the disadvantage in that a considerable time delay is necessary before a permanent record is produced. The facsimile type mechanisms can not be adapted to forming a permanent record of a high-frequency electrical wave form because inherently these mechanisms are slow operating because the stylus instead of the paper is moved.

It is therefore the object of this invention to produce a device which will produce an immediately available record of an electrical wave form of a frequency of at least 20 kilocycles.

Figure 1:
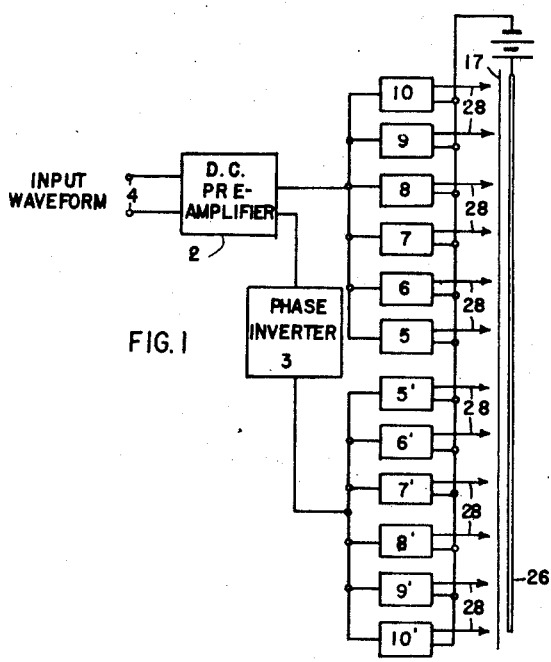

Other objects and features will become apparent from a perusal of the following specification and drawing of which; Fig. 1 is a diagrammatic drawing of the instant invention and Fig. 2 is a perspective view of the paper drive mechanism and the recording means.

The present embodiment is the preferred embodiment but it is to be understood that changes can be made in the present embodiment by one skilled in the art without departing from the spirit and scope of this invention.

Generally, the invention comprises a paper drive mechanism which moves a length of electrically sensitive paper at a certain speed over a platen, a bar having a number of styli therein projecting over the paper and closely adjacent to the platen, and a number of trigger amplifiers connected in parallel to the source of the input wave form. The styli are connected to the group of trigger amplifiers, one amplifier to each stylus. Each of the trigger amplifiers are differently biased so that each one will start to conduct current only when the voltage applied to the input side of the amplifier reaches the voltage to which the amplifier has been biased. The trigger amplifiers are all connected in parallel to a first amplifier, and the electrical wave form to be recorded is applied to the input side of the first amplifier. Therefore as the input wave form is applied to the first amplifier it is amplified and in turn applied in parallel to the trigger amplifiers. As any one stage of the trigger amplifiers conducts it causes a flow of current through the stylus to which that amplifier is connected. The current in turn passes from the stylus through the electrically sensitive paper to the platen. As the current passes to the platen a mark is left on the electrically sensitive paper. As the wave form voltage drops below the triggering voltage the stage ceases to conduct and a mark is no longer formed on the electrically sensitive paper. The record on the paper will therefore consist of a series of spaced parallel lines of varying length, the envelope of which will describe the input wave form.

Figure 2:
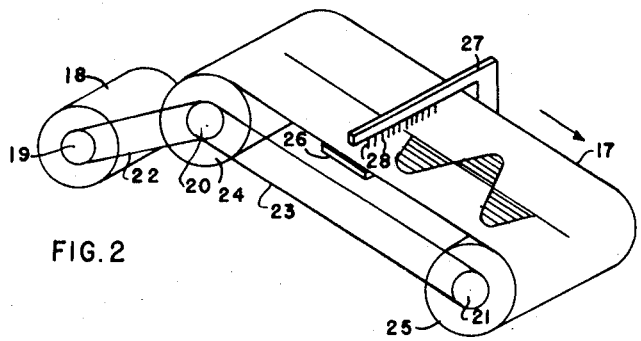

To describe the invention in detail, reference is made to Fig. 2. Two rollers 24, 25 are rotatively mounted some distance apart. The rollers 24 and 25 have pulleys 20 and 21, respectively, mounted on the ends thereof. A belt 23 mounted on the pulleys 20 and 21 interconnects the rollers 24 and 25 so that they may be rotated at the same speed. A motor 18 is provided for rotating the rollers 24 and 25. The motor 18 has a pulley 19 on one end thereof. A belt 22 is mounted on the pulley 19 and the pulley 20 so that when the motor 18 is operated the rollers 24 and 25 are caused to rotate. An electrically sensitive paper 17 is mounted on the rollers 24 and 25 so that as the rollers are rotated the paper 17 is moved longitudinally. The paper 17 is of a type which produces a colored mark when current is passed through it. The colored mark produced by the passage of the current can be caused by a burning action in the paper or by a chemical change in the paper. Reference lines or grids may be printed upon the paper as an aid to the analyzation of the wave forms to be produced upon the paper. The paper is moved longitudinally at a speed to conform to the frequency of the wave form being recorded. The higher the frequency of the wave form to be recorded, the more rapidly the paper 17 is moved. A platen 26 is mounted just below and transverse to the paper 17. This platen 26 forms one electrode for the passage of current through the paper 17. Above the paper 17 a comb 27 is mounted. This comb 27 is mounted parallel and closely adjacent to the platen 26. Mounted longitudinally in the comb 27 are a series of styli 28. The distance between the styli can be varied according to the accuracy demanded of the record. These styli 28 extend in a downward direction from the comb 27 and are closely adjacent to the paper 17.

Turning next to the means for causing the colored marks, described above, on the paper 17, reference is made to Fig. 1, wherein this apparatus is shown diagrammatically. A first amplifier tube is provided for initially amplifying the electrical wave form to be recorded. The input wave form is applied to the terminals 3 and 4 of the first amplifier. This first amplifier 2 is a direct current amplifier of any type well known in the art for amplifying electrical wave forms of a frequency of at least 20 kilocycles. A number of trigger amplifiers 5-10 are connected in parallel on their input side to the output side of the first amplifier 2. A phase inverter is also connected to the output side of the first amplifier 2, and another group of trigger amplifiers 5'-10' are connected to the output side of the phase inverter. Therefore, the amplified wave form is applied to the input of all of the trigger amplifiers 5-10 and 5'-10' simultaneously, except that the phase of the amplified wave form applied to trigger amplifiers 5'-10' is inverted. Twelve trigger amplifiers are shown in the present embodiment, but the number can be varied according to the accuracy demanded of the record. In the present embodiment the trigger amplifiers 5-10 and 5'-10' are arranged to snap into a conducting state from their normal non-conducting state when a particular voltage is applied to their input grids. Also, these trigger amplifiers 5-10 and 5'-10' will snap into their normal non-conducting state from the conducting state when the voltage applied to their input grids drops below the aforementioned particular voltage. These amplifiers 5-10 and 5'-10' are of the direct coupled Eccles-Jordan "flip-flop" type. Each one of the trigger amplifiers 5-10 has its grid biased to a different voltage, and each one of the trigger amplifiers 5'-10' has its grid biased to the same voltage as the comparable amplifier of the group 5-10. Therefore amplifiers 5 and 5' and 10 and 10' are biased to the same voltage. These amplifiers 5-10 and 5'-10' are biased at successively higher voltages so that each amplifier stage will conduct current in its plate circuit only when the voltage of the input wave form reaches the voltage to which the amplifiers are biased. Amplifiers 5 and 5' are biased to the lowest voltage and amplifiers 10 and 10' are biased to the highest voltage. The number of trigger amplifiers 5-10 and 5'-10' corresponds with the number of styli 28, there being one trigger amplifier for each stylus. The plate circuits for the amplifiers 5-10 and 5'-10' are directly connected to the styli 28. The plate supply voltage for the trigger amplifiers 5-10 and 5'-10' is connected to the platen 26. Therefore, the plate circuits for the trigger amplifiers 5-10 and 5'-10' are completed across the gap between the styli 28 and the platen 26 and through the paper 17.

To now describe the operation of the instant invention reference is made to Figs. 1 and 2. First the motor is operated to cause the paper 17 to move longitudinally at a speed conforming to the frequency of the input wave form. The input wave form is applied to the first amplifier 2. The amplified wave form is in turn applied to the trigger amplifiers 5-10 and 5'-10'. As the voltage of the wave form rises or increases in a positive direction the trigger amplifiers 5-10 successively begin to conduct. None of the amplifiers 5'-10' will conduct because of the inverted phase the voltage applied to amplifiers 5'-10' will be falling or increasing in a negative direction to further increase the bias on the amplifiers 5'-10'. The current passes through the styli 28, through the paper 17, to the platen 26, to the plate power supply. As the wave form voltage drops below the triggering voltage of any of the amplifiers 5-10 which are conducting, those amplifiers will cease to conduct and the arc of current from the styli connected to those amplifiers then ceases. As the voltage of the wave form falls further or increases in a negative direction the trigger amplifiers 5'-10' will successively begin to conduct due to the inverted phase of the wave form at the output of the phase inverter. It can then be seen that the marks on the paper 17 will consist of a series of parallelly spaced lines of varying length. The envelope of these parallelly spaced lines will describe the input wave form, and therefore an immediately available record of the input wave form is produced.

The present embodiment employs trigger amplifiers of the modified Eccles-Jordan type, however thyratrons may be used. When the thyratrons are used as the trigger amplifiers, the plate voltage of the trigger amplifiers is an alternating current source of a frequency substantially higher than the frequency of the recorded wave form. Thus the plates of the trigger amplifiers are alternately driven positive and negative. This is to retain control over any one amplifier by its grid, since when the plate voltage is negative conduction of current in the plate circuit will cease, and control over the amplifier by the grid will be reestablished. The trace resulting from the use of thyratrons as trigger amplifiers will consist of a series of parallelly spaced dashes the envelope of which will describe the input wave form.

Having described my invention what I consider new and desire to be protected by Letters Patent is:

1. In a direct indicating oscillograph for recording electrical wave forms, an electrically sensitive paper, means for moving said paper longitudinally at a high speed, a platen mounted below and transverse to said paper, a comb, said comb mounted above and transverse to said paper, a plurality of styli, said styli mounted longitudinally in and depending from said comb closely adjacent to said paper, a direct current amplifier which receives and amplifies said electrical wave forms for recording, a plurality of trigger amplifiers, the inputs of said trigger amplifiers connected in parallel to the output of said direct current amplifier, a phase inverter, the input of said phase inverter connected to the output of said direct current amplifier, a second plurality of trigger amplifiers, the inputs of said second plurality of trigger amplifiers connected in parallel to the output of said phase inverter, the outputs of each of said trigger amplifiers connected to different ones of said styli and to said platen so that said outputs of all of said trigger amplifiers are completed across the gap between said styli and said platen and through said paper, said trigger amplifiers biased so that each trigger amplifier passes current through its output when a voltage of a particular value or higher is applied to the input and ceases to pass current when the voltage applied to the input drops below said particular value, said particular value of voltage to which each trigger amplifier is biased being different for each trigger amplifier in each plurality of trigger amplifiers.

2. In a direct indicating oscillograph for recording electrical wave forms on an electrically sensitive paper, means for moving said paper longitudinally at a high speed, a platen mounted below and transverse to said paper, a comb mounted above and transverse to said paper, a plurality of styli mounted longitudinally in and dependent from said comb, the lower ends of said styli closely adjacent to said paper, a direct current amplifier which receives and amplifies said electrical wave forms for recording, a plurality of trigger amplifiers, the inputs of said amplifiers connected in parallel to the output of said direct current amplifier, a phase inverter, the input of said phase converter connected to the output of said direct current amplifier, a second plurality of trigger amplifiers, the inputs of said second plurality of trigger amplifiers connected in parallel to the output of said phase inverter, the outputs of each of said trigger amplifiers connected across different ones of said styli and said platen so that circuits are completed across the outputs of all of said trigger amplifiers, the circuits including the gap between said styli and said platen and through said paper, said trigger amplifiers biased so that each trigger amplifier passes current through the circuit across its output when a voltage of a particular value or higher is applied to the input of that trigger amplifier and ceases to pass current when the voltage applied to the input of that amplifier drops below said particular value, said particular value of voltage to which each trigger amplifier is biased being different for each trigger amplifier in each plurality of trigger amplifiers.

3. In a direct indicating oscillograph for recording electrical wave forms on an electrically sensitive paper, means for moving said paper longitudinally at a high speed, a platen mounted below and transverse to said paper, a comb mounted above and transverse to said paper, a plurality of styli mounted longitudinally in and dependent from said comb, the lower ends of said styli closely adjacent to said paper, a plurality of trigger amplifiers, the inputs of said amplifiers connected in parallel to the wave form to be recorded, a phase inverter, a second plurality of trigger amplifiers, the input of said phase inverter connected to the wave form to be recorded, the inputs of said second plurality of trigger amplifiers connected in parallel to the output of said phase inverter, the outputs of each of said trigger amplifiers connected across different ones of said styli and said platen so that a circuit is completed across each of the outputs of said trigger amplifiers which includes the gap between one of said styli and said platen and through said paper, said trigger amplifiers biased so that each trigger amplifier passes current through the circuit across its output when a voltage of a particular value or higher is applied to the input of that amplifier and ceases to pass current when the voltage applied to the input of that amplifier drops below said particular value, said particular value of voltage to which each trigger amplifier is biased being different for each trigger amplifier in each plurality of trigger amplifiers, whereby as the voltage of the wave form rises different ones of said amplifiers of said first plurality of trigger amplifiers cause current to flow through said paper leaving a record on the paper and as the voltage of the wave form drops different ones of said amplifiers of said first plurality of trigger amplifiers cease to conduct current through the paper ceasing to mark the paper and different ones of said second plurality of trigger amplifiers cause current to flow through said paper having a record on said paper.

4. In a direct indicating oscillograph for recording electrical wave forms on an electrically sensitive paper, means for moving said paper longitudinally at a high speed, a platen below and transverse to said paper, a comb mounted above and transverse to said paper, a plurality of styli mounted longitudinally in and dependent from said comb, the lower ends of said styli closely adjacent to said paper, a direct current amplifier which receives and amplifies said electrical wave forms for recording, a plurality of bistable multivibrators, the inputs of said multivibrators connected in parallel to the output of said direct current amplifier, a phase inverter, the input of said phase inverter connected to the output of said direct current amplifier, a second plurality of bistable multivibrators, the inputs of said second plurality of bistable multivibrators connected in parallel to the output of said phase inverter, the outputs of said bistable multivibrators sequentially connected in sequence across said styli and said platen so that a circuit is completed across the output of each of said multivibrators, the circuits including the gap between said styli and said platen and through said paper, said multivibrators of each plurality of multivibrator biased at sequentially higher voltages so that each multivibrator passes current through the circuit across its output when a voltage of a particular value or higher is applied to the input of that multivibrator and ceases to pass current when the voltage applied to the input of that multivibrator drops below said particular value, said multivibrators connected to said styli so that the multivibrator of each plurality of multivibrators having the lowest biasing voltage are connected to adjacent styli at the center of said plurality of styli, so that when the voltage of the wave form rises the multivibrators of said first plurality of multivibrators sequentially begin to conduct current through the paper and as the voltage of the wave form drops the multivibrators of said first plurality of multivibrators sequentially cease to conduct current through the paper and the multivibrators of said second plurality of multivibrators sequentially begin to conduct current through the paper thereby marking the paper with a series of parallel lines the envelope of which describes said electrical wave forms.

5. In a direct indicating oscillograph as claimed in claim 4, said means comprising a pair of rollers, said paper wound about said rollers and extending between said rollers, a motor, means on said motor and said rollers for causing said rollers to rotate at a high speed when said motor is operated whereby said paper is moved longitudinally at a high speed.

6. In a direct indicating oscillograph for recording electrical wave forms, an electrically sensitive paper, means for moving said paper longitudinally at a speed corresponding to the frequency of the electrical wave forms, a platen mounted below and transverse to said paper, a comb, said comb mounted above and transverse to said paper, a plurality of styli, said styli mounted longitudinally in and depending from said comb closely and adjacent to said paper, a direct current amplifier which receives and amplifies said electrical wave forms for recording, a plurality of trigger amplifiers, the inputs of said trigger amplifiers connected in parallel to the output of said direct current amplifier, the outputs of each of said trigger amplifiers connected to different ones of said styli and to said platen so that said outputs of all of said trigger amplifiers are completed across the gap between said styli and said platen and through said paper, said trigger amplifiers biased so that each trigger amplifier passes current through its output when a voltage of a particular value or higher is applied to the input and ceases to pass current when the voltage applied to the input drops below said particular value, said particular value of voltage to which each trigger amplifier is biased being different for each trigger amplifier.

7. In a direct indicating oscillograph as claimed in claim 6, said means comprising a pair of rollers, said paper wound about said rollers and extending between said rollers, a motor, means on said motor and said rollers for causing said rollers to rotate at a speed corresponding to the frequency of the electrical wave forms when said motor is operated, whereby said paper is moved longitudinally at a speed corresponding to the frequency of the electrical wave forms.

DUNCAN N. MacDONALD.

No references cited.